United States Patent

[11] 3,618,994

| [72] | Inventors | Paul J. Gepfert<br>Shaker Heights;<br>Thomas E. Cyphert, Solon, both of Ohio |
|---|---|---|
| [21] | Appl. No. | 824,648 |
| [22] | Filed | May 14, 1969 |
| [45] | Patented | Nov. 9, 1971 |
| [73] | Assignee | Loopco Industries, Inc.<br>Twinsburg, Ohio<br>Continuation-in-part of application Ser. No. 674,198, Oct. 10, 1968, now abandoned. |

[54] ARBOR NUT
4 Claims, 8 Drawing Figs.
[52] U.S. Cl. .................................... 287/53 R,
85/32 R
[51] Int. Cl. ..................................... F16d 1/06
[50] Field of Search ........................... 85/32,
53 R; 287/52.06; 151/21 C, 67

[56] References Cited
UNITED STATES PATENTS

| 439,660 | 11/1890 | Holmquist | 151/21 C |
|---|---|---|---|
| 609,144 | 8/1898 | Goddin | 151/21 C |
| 1,097,218 | 5/1914 | Gast et al. | 151/21 C |
| 2,136,592 | 11/1938 | Mayer | 85/1 SS |
| 2,812,684 | 11/1957 | Schrem | 85/32 |
| 2,835,518 | 5/1958 | Naab | 287/52.06 |
| 2,953,417 | 9/1960 | Horberg | 85/32 |

*Primary Examiner*—Edward C. Allen
*Attorney*—Fay, Sharpe and Mulholland

ABSTRACT: Disclosed are several embodiments of an invention relating to an arbor nut for detachably interconnecting and tightening machine elements. One embodiment of the nut includes a body provided with a threaded main bore, a first and second side face and an exterior transverse peripheral face lying therebetween. A plurality of threaded bores are defined in the body extending from the first side face to the second side face. Jacking screws are disposed within each of said bores. The jacking screws are defined by socket heads adapted to be turned and advanced by means of an Allen wrench and swivel pads at the ends of the screws opposite the socket heads. Each of the swivel pads comprises a bearing element having a face and includes a spherical bearing seat adapted to engage a complementary bearing surface of the jacking screw. In operation, the nut is advanced hand tight against an adjacent machine element. An Allen wrench is then utilized to advance the jacking screws against the face of the adjacent machine element in order to lock the elements firmly on the arbor. Any misalignment of the adjacent element and the body of the nut is compensated for by the swivel pad at the end of the jacking screw. The swivel pad also isolates the rotary movement of the jacking screw from the adjacent machine element.

A second embodiment of the invention includes the nut as heretofore described which further includes an additional bore in the body of the nut extending from its first side face to its second side face. A locking member, disposed in the additional bore has a threaded portion engaged with the threaded portion of the additional bore and includes an end portion which is capable of extending beyond the first side face of the nut to engage a recess in the machine element adjacent to the nut. A pilot hole may also be provided in the nut for locating one or more recesses in the adjacent machine element. If desired, the recesses in the adjacent machine element may take the form of a cylindrical bore complementary in shape to the locking member.

A third embodiment of the nut according to the invention includes a pair of opposed faces forming a gap in the body of the nut, each opposed face being defined by a surface having the perimeter comprising the threaded main bore of the nut, its first and second side faces, and its exterior peripheral surface. In a preferred embodiment, an adjustment means includes a threaded bore and counterbore extending from the exterior surface of the body of the nut beyond the pair of opposed faces in a direction generally transverse to the faces. A securing member is located in said threaded bore in such a manner that the rotation of the securing member causes a change in the length of the gap.

PATENTED NOV 9 1971 3,618,994

INVENTORS
PAUL J. GEPFERT
THOMAS E. CYPHERT
BY
Fay, Sharpe & Mulholland
ATTORNEYS.

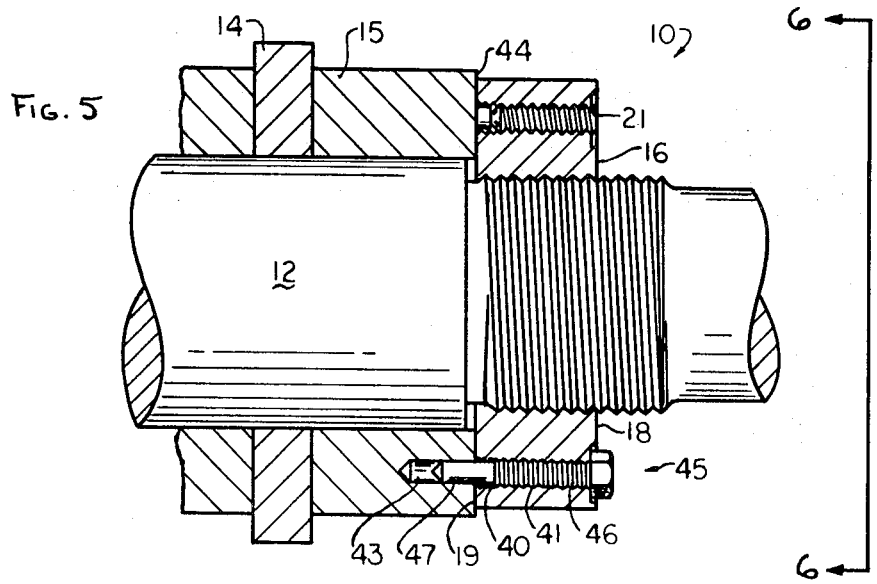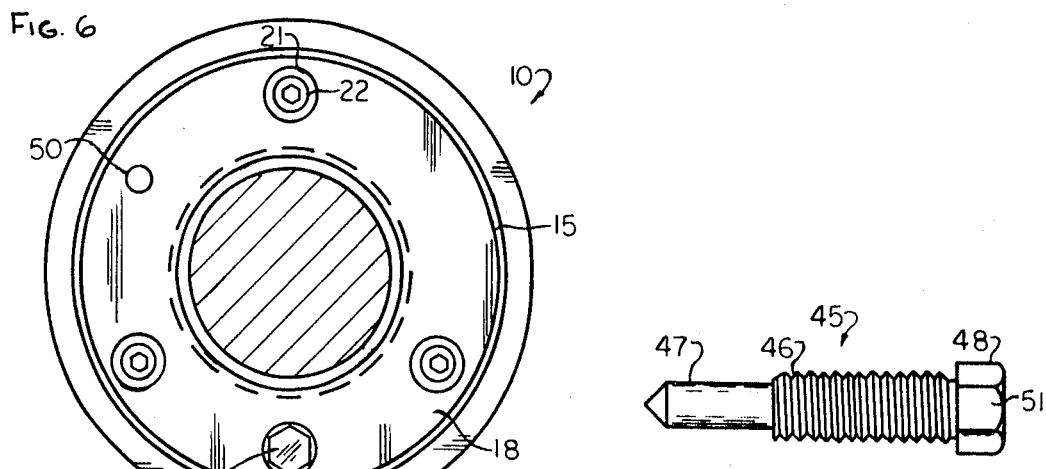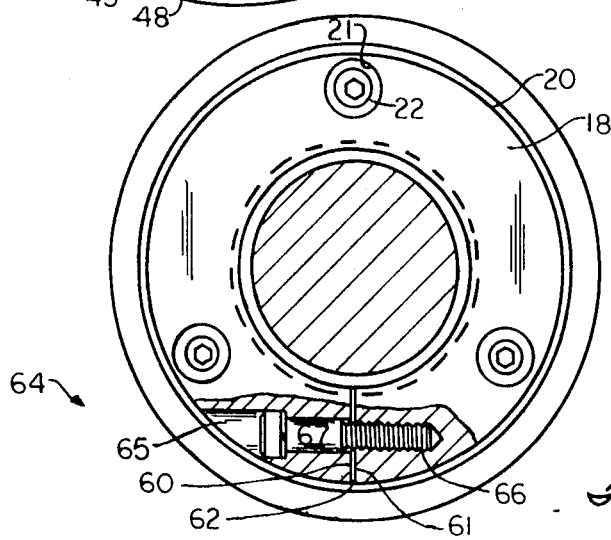
INVENTORS
PAUL J. GEPFERT
THOMAS E. CYPHERT
BY
Fay, Sharpe & Mulholland
ATTORNEYS

ARBOR NUT

CROSS-REFERENCES TO RELATED APPLICATIONS

This application is a continuation-in-part of the applicant's copending application, Ser. No. 674,198, filed Oct. 10, 1968, and now abandoned.

BACKGROUND OF THE INVENTION

This invention relates to a connecting device for detachably connecting and tightening together machine elements on a rotating arbor.

For purposes of interconnecting or tightening together machine elements, tools, workpieces or the like, it is customary to employ threaded bolts and nuts. However, with such a combination of elements, high friction losses occur in the relative rotation of the threaded elements when tightening the nut or the bolt. Further, contacting faces of the relatively rotatable connecting elements produce thread and face deformation of the elements. When high contact pressure is required for connecting or tightening the elements together, a relatively high torque is required which, due to the friction losses between the threads on the one hand and between the contacting faces of the elements on the other hand imposes severe torsional strain on the elements.

When using conventional locking nuts, loads delivered into the tooling tend to be transmitted back to the locking nut and, depending upon the direction of the threads, tend either to loosen the nut or tighten it further, making subsequent removal even more difficult.

Machine element fastening problems are particularly acute in instances where tooling is continually changed. Thus, on gear cutting arbors, gear hobbing and shaving machines, horizontal milling machines, steel-slitting equipment, tool posts, and other similar machines, it is customary to employ a large size hex head or spanner-type nut which is generally locked on the arbor by impact blows imparted to the nut by means of a hammer urged wrench. Loosening of the nut, as when tooling is to be replaced, involves a reverse operation wherein the spanner wrench or hex head wrench is jarred, as by means of a hammer, in order to impart an impact blow to the nut, thus releasing the nut from the arbor. This type of conventional fastening of tooling to an arbor necessarily involves a continuing program of replacement of spanner wrenches, pins, hex head or spanner-type nuts, and even the arbor itself. The cost of such replacement is often prohibitive. The physical effort required by the machine operator along with the constant danger of injury to his person renders these conventional fastening means generally undesirable for industrial use.

The problems of tightening and maintaining the tightness of rotational machine elements and their lock nuts are particularly acute in machines in which the loads are in one direction during part of the operation and in the opposite rotational direction during a second part of the cycle. In that instance, it is not completely possible to lock a nut onto an arbor by means of an appropriately chosen thread direction. Thus, jogging during threading could easily unloosen a nut which is threaded in a direction that would cause it to tighten once the machine is in running operation.

Many suggested improvements have been made in the area of lock nuts for developing sufficient resistance to inadvertent rotation in a threaded shank without customary thread and face deformation. Hydraulic lock nuts or tensioning nuts have been proposed wherein a pressure generating member is attached to the nut for the purpose of actuating a pressure pad to effect clamping. While many of the hydraulic nuts are suitable for specific applications, these nuts become prohibitive in price in the larger sizes. Furthermore, when considering the locking of tooling onto an arbor, serious technical questions have been raised about the suitability and safety of the hydraulic locking nut or tensioning nut due to leakage of the hydraulic seals and resulting loosening of the connection.

This invention provides an improved mechanical locking nut for attaching tooling to an arbor. While the preferred embodiments of this invention will be described with reference to an arbor, it should be understood that this invention is broadly applicable to fastening of machine elements wherein one of the elements includes a threaded shank.

Briefly described, the arbor nut of one embodiment of this invention includes a body portion provided with a threaded main bore adapted to be received over the threaded shank of an arbor or other fastening element. The body includes a first and second side face and an interconnecting exterior surface. A plurality of threaded bores are provided in the body extending from the first face to the second face. The axes of said threaded bores are generally parallel to the axis of the threaded shank. The first and second faces are generally normal to the axis of the body. The exterior peripheral surface may include a knurled or grooved portion, so that the nut may be advanced manually, or tool pads for wrench engagement.

A plurality of jacking screws are disposed within the threaded bores. Each jacking screw includes a socket head portion adapted to be engaged by a suitable tool such as an Allen wrench At the opposite end of the jacking screw, there is provided a spherical bearing surface adapted to contact a complementary spherical bearing seat of a swivel pad. The swivel pad is provided with an exterior face adapted to engage tooling or other machine elements.

In operation, the nut is advanced over the threaded shank portion of the arbor until it abuts the tooling. The jacking screws are then rotated by means of a suitable tool until the swivel pad abuts the tooling. Continued rotation of the jacking screws imparts an extremely high linear pressure to the tooling firmly locking the nut in place. To release the tooling, the operator simply releases the jacking screws. The body of the nut is then free to be rotated so as to remove the nut from the threaded shank portion of the arbor.

Where heavy loads are involved, or in situations in which there is abnormal vibration or the rotation of the machine elements is not always in the same direction, it has been found desirable to increase further the resistance of the combination to inadvertent rotation of the nut from the arbor. To this end, another embodiment of the invention includes another bore having a threaded portion. The bore is located in the body of the nut and extends from the first side face to the second side face. A recess is provided in the side face of the machine element which is adjacent to the nut, for example, in the spacer. A locking member having a threaded portion engaged with the threaded portion of the bore in the nut includes an unthreaded end portion which may be engaged with the recess in the adjacent machine element. When thus engaged, the combination is additionally secured against unwanted rotation by the virtue of the coaction between locking member in the arbor nut and the recess in the adjacent machine element. As disclosed, the recess may be a generally cylindrical bore in the spacer and the locking member may assume the form of a bolt having a generally cylindrical end portion for engagement with the generally cylindrical bore in the spacer.

A pilot hole for locating the recess in the adjacent machine element may also be disposed in the body of the nut from the first side face to the second side face thereof. In operation, the nut is hand tightened against the spacer. Using the pilot hole in the body of the arbor nut, a hole is drilled into, or if desired, through the spacer. Since it has been found desirable and convenient to include additional recesses in the spacer for convenient operation, the outside diameter of the spacer may be center punched at a point opposite the location of the first recess. By causing the reverse rotation of the arbor nut through a desired degree of rotation, and by repeating the drilling and center punching step, an additional recess may be located in the spacer. Thus, for convenience when retightening of machine elements, the operator need not seek only a single recess, but may more quickly locate one of a plurality of recesses.

A further embodiment of the invention directed to a solution of the above-identified problem includes the arbor nut as initially described, but further including a pair of opposed faces forming a gap in the body of the nut. Each face is defined by a generally planar surface having its perimeter determined by the threaded main bore of the nut, the firs and second side faces of the nut, and the exterior surface of the nut. Means for adjusting the length of the gap between the opposed faces are provided so that the nut bay be secured against the arbor and against inadvertent rotation. As disclosed, the means for adjusting the gap includes a bore having a threaded portion and located in the body. The bore extends from the exterior surface of the nut in a direction generally transverse to the plane of the pair of opposed faces, and is of sufficient length to traverse both faces. A securing member is located in the bore in such a manner that rotation of the securing member causes a change in the length of the gap by drawing the portion of the nut adjacent one face to closer proximity to the portion of the nut adjacent the second face.

DESCRIPTION OF THE INVENTION

A more complete description of the preferred embodiments of this invention will now be made with reference to the accompanying drawings, in which:

FIG. 5 is an elevational cross-sectional view of a second embodiment of the arbor nut according to the invention as assembled on the threaded shank portion of an arbor;

FIG. 6 is an end view of the nut taken along line 6—6 of FIG. 5;

FIG. 7 is an elevational view showing the locking member of FIGS. 5 and 6 in greater detail;

FIG. 8 is an end view partly in section showing an additional embodiment of the arbor nut according to the invention.

Figure 1:
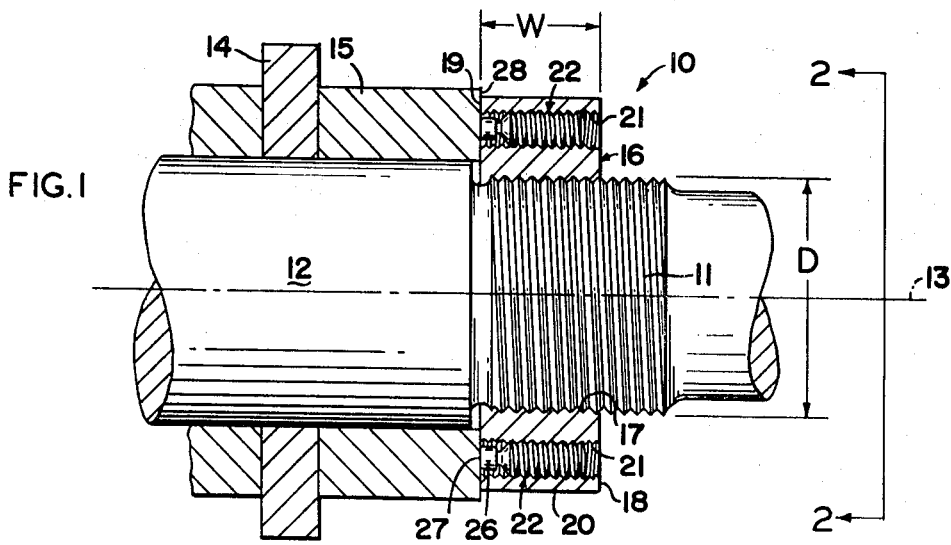
FIG. 1 is an elevational cross-sectional view of the arbor nut of this invention as assembled on the threaded shank portion of an arbor.

There is shown in FIG. 1 the arbor nut of this invention generally indicated at 10, positioned on the threaded shank portion 11 of an arbor 12. The centerline of the arbor and the threaded shank portion 11 of the arbor is identified at 13. Disposed about the arbor 12 is a rotatable tool such as a slitter knife 14. A spacer 15 is interposed between the slitter knife and the arbor nut 10. For clarity, the remaining portion of the arbor has not been shown in FIG. 1 although it is to be understood that the entire assembly including the arbor, the slitter knife, the spacer, and the arbor nut rotate in unison.

Attention is now directed to the arbor nut 10 which, as shown in FIG. 1, is provided for the purpose of firmly locking the slitter knife 14 to the arbor 12. The arbor nut 10 is comprised of a body portion 16 including a threaded main bore 17 adapted to receive the threaded shank portion 11 of arbor 12. Body 16 is a generally annular element including a first and second side face 18, 19. Faces 18, 19 are interconnected by an exterior surface 20. Surface 20 may include knurled or grooved portions so that the arbor nut 10 may be more readily manually advanced over the threaded shank portion 11. Conversely, face 20 may include tool pads in the event that it is desired to rotate the arbor nut 10 by means of a wrench or other torquing means.

Disposed within the body 16 are a plurality of threaded bores 21 in which there are disposed jacking screws 22. As shown in the preferred embodiment of FIG. 1, the axes of threaded bores 21 are generally parallel to axis 13.

Figure 2:
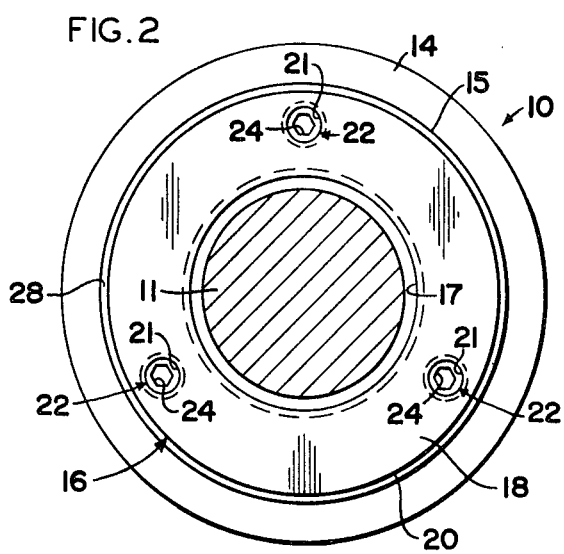
FIG. 2 is an end view taken along the line 2—2 of FIG. 1.
Figure 3:
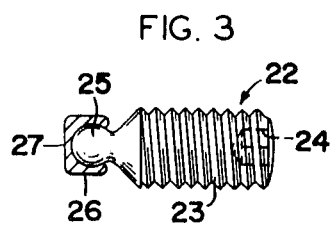
FIG. 3 is an elevational view partly in section showing in greater detail the jacking screw of FIG. 1.

An enlarged view of the jacking screw 22 of FIG. 1 is shown in FIG. 3. Jacking screw 22 is generally defined as an exteriorly threaded cylindrical body 23 including a socket 24 at one end thereof. As shown in FIG. 2, socket 24 is generally hex-shaped in order to receive an Allen wrench for purposes of rotating the jacking screw. Again referring to FIG. 3, the opposite end of body 23 includes a spherical bearing portion 25. Spherical bearing portion 25 is adapted to be received within a complementary recess or seat of swivel pad 26. Swivel pad 26 includes a bearing face 27 adapted to abut spacer 15 as shown in FIG. 1. As shown in FIG. 2, three jacking screws 22 are disposed approximately 120° apart. It is to be understood that more or less jacking screws may be utilized although three is considered to be the minimum number of screws required to effectively lock the nut.

Although the size of the body 16 of arbor nut 10 will vary depending upon the arbor 12, the preferred embodiment of this invention, as shown in FIG. 1, utilizes a body including a width W that is approximately one-half of the diameter D of the threaded shank portion 11.

The operation of the arbor nut of this invention will now be described with reference to FIG. 1. Having disposed the slitter knife 15 about the arbor 12, the spacer 15 is then positioned adjacent the slitter knife 14 and the arbor nut 10 is threadedly advanced over the shank portion 11 until it is handtight against the spacer 15. In this position, swivel pad 26 of jacking screws 22 are recessed in the threaded bores 21 of the body 10 such that side face 19 of body 16 abuts the face of spacer 15. With the arbor nut 10 handtight against the spacer 15, the jacking screws are then rotated by means of a suitable wrench such as an Allen wrench. Rotation of each of the jacking screws 22 will advance the jacking screws into contact with spacer 15 as face 27 of swivel pad 26 abuts the face 28 of spacer 15. Continued turning of the jacking screws 22 will induce high linear pressure against the spacer 15 and the slitter knife 14 while locking the arbor nut 10 with respect to the threaded shank portion 11.

The pivotal relationship of the swivel pad 26 and the body 23 of the jacking screw 22 provides a number of advantages for the arbor nut of this invention. Since the body 23 of screw 22 may rotate with respect to the swivel pad 26, face grinding or deformation of the screw on the spacer or tooling has been eliminated as the relative motion between the body 23 and the spacer 15 is taken up by the spherical connection between the bearing 25 and the swivel pad 26. The spacer 15 or tooling is thus engaged by a nonrotating pad. Furthermore, since the pads 26 are free to swivel or pivot with respect to the bodies 23, any slight misalignment of the face 28 of the spacer 15 and the side face 19 of the arbor nut 10 may be compensated for by the swivel pad 26. Thus, the spacer or tooling will not become distorted with continued use because the plane of the end face of the spacer or tooling is not exactly normal to the axis of the arbor.

It can now be seen that the above described structure greatly reduces the physical effort required to induce high linear pressure in an arbor by means of an arbor nut. Problems encountered in the prior art are such as cut fingers, distorted arbor nuts, distorted threaded shanks of the arbor, broken spanner wrenches, etc. have been eliminated. The jacking screws of this invention coacting against the face of tooling or spacer elements, give the operator a high mechanical advantage in order to induce linear pressure on the tooling or spacer. Since the axes of the jacking screws do not coincide with the axis of the tooling, loads delivered to the tooling and transmitted back into the body of the nut will not loosen or tighten the jacking screws.

MODIFICATION OF THE INVENTION

While the invention has not been described with reference to a preferred embodiment of FIG. 1, it is to be understood that the invention is, by no means, limited to the particular construction shown in FIG. 1. The invention also comprises any modifications within the scope of the appended claims. As an example, the body 16 of the arbor nut 10 has been described as initially advanced handtight against the tooling such that the side face 19 of the body will abut an end face 28 of the spacer 15. Thereafter, the jacking screws 22 are advanced out of the bores 21 of the body into contact with he spacer 15. Equally within the scope of this invention should be considered structures wherein a clearance is provided between the side face 19 of the body 16 and the end face 28 of spacer 15. Where such a clearance is provided, said clearance will be spanned by the jacking screws 22 extending from the body into abutting engagement with the end face of spacer 15.

Figure 4:
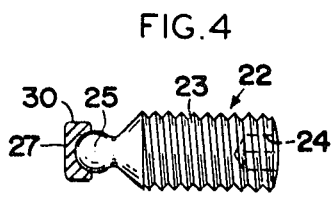
FIG. 4 is an elevational view partly in section showing a modification of the jacking screw of FIG. 3.

A modification of the jacking screw is shown in FIG. 4. The body 23 of the screw of FIG. 4 is generally similar to the body 23 of FIG. 3. The pad 30 of FIG. 4, however, is loose in that it is not captured on the bearing portion 25 as by turning in the side faces of the pad as is shown in FIG. 3. The construction of FIG. 4 is more simplified than that of FIG. 3 although the operator must manually hold the pad in place until face 27 abuts the tooling. The use of grease may be sufficient to retain the loose pad of FIG. 4 in place while tightening.

Other modifications of the jacking screw are contemplated and should be considered within the scope of this invention. The pad portion of the jacking screw could be pinned to the body of the screw. A single or double universal joint connection could thereby be established between the screw body and the pad. Alternately the end of the screw body opposite the socket head end could be provided with a recess to receive a projection of the pad to thereby provide a connecting means between the members.

In certain limited applications the use of a jacking screw body without a pad may be possible. Thus, the portion 25 of FIG. 4 could directly bear on the tooling without an intermediate pad 30. Because of the inherent advantages of the pad, previously discussed, the use of a padless jacking screw will not produce the desirable results of the preferred embodiment.

In FIGS. 5 through 8, like numerals have been included for references to the same elements as referred to in FIGS. 1 through 4. FIGS. 5 through 7 depict an alternative embodiment of the nut according to the invention which is particularly adapted to secure heavy loads or loads in which the rotation of the machine is not always the same direction. In addition to the threaded bores 21 disposed in the body portion 16 of arbor nut 10, an additional bore 40 having a threaded portion 41 is also located in the body portion 16 of the arbor nut 10. Bore 40 extends from a first side face 18 to the second side face 19 of the body 16.

A recess 43 is located in the second face 44 of the adjacent machine element, in this instance the spacer 15. A locking member 45 includes a threaded portion 46 engaged with the threaded portion 41 of the bore 40 and having an end portion 47 engaged with the recess 43 of the second side face 44 of spacer 15. End portion 47 and recess 43 are preferably not threaded to permit a certain degree of axial movement of the combination as the jacking screws 22 are tightened as heretofore described. Thus, in operation, the arbor nut 10 is hand tightened against the spacer 15, as heretofore described, and the combination tightened by rotation of the jacking screws 22 either before or after rotation of the jacking screws to cause an axial tightening of the overall combination. Locking member 45 may be rotated until that its end portion 47 engages the recess 43. If end portion 47 and recess 43 are threaded, it is preferred that the jacking screws be tightened first and the locking member secured thereafter. The primary requirement of the locking member 45 is to secure the nut and spacer combination against relative rotational movement.

As can be seen in FIG. 6, a pilot hole 50 may be included in the body of the arbor nut for locating the recess 43 in the spacer 15. After the arbor nut 10 is hand tightened against the spacer 15, a drill is inserted in the pilot hole for locating recess 43, or drilling completely through the spacer, if desired. When it is desired to provide a plurality of recesses 43 in spacer 15, the nut may be rotated the desired extent and additional recesses 43 provided in the spacer. Care must be exercised, however, so that recess 43 is not provided at that point on the spacer which would be engaged by the bearing face 27 of the swivel pad 26 in the jack screw 22 when locking member 45 is disposed in one of the recesses 43 in spacer 15.

As heretofore explained, locking member 45, as shown in FIG. 7, includes a threaded portion 46, head portion 48, and an end portion 47. If desired, head portion 48 may be provided as an Allen-type recess socket similar to the socket 24 shown in FIG. 3. In the embodiment depicted, however, it has been found convenient to utilize the lower cost boltlike member having a head portion 48 with hexagonal tool pads as at 51. As previously explained, it is preferable that the threaded portion 46 not extend the entire length of the shank of the locking member 45 so that the end portion 47 is capable of axial movement when positioned in recess 43 during the tightening of jack screws 22.

The embodiment in FIG. 8 shows the arbor nut 10 according to the invention as including a pair of opposed faces 60 and 61 forming a gap 62 in the body of the nut. Faces 60 and 61 may conveniently be formed by a saw cut through the arbor nut 10. Thus, faces 60 and 61 are generally planar surfaces having a perimeter defined by the threaded main bore 17, exterior surface 20, the first side face 18 and the second side face 19 of nut 10.

Means 64 are provided for adjusting the length of the gap between opposed faces 60 and 61, so that the nut 10 may be secured to the arbor 12. Adjustment means 64 include a bore 65 including at least a threaded portion 66 located in the body portion 16 of arbor nut 10. Bore 65 extends from the exterior surface 20 of the nut beyond the pair of opposed surfaces 60 and 61 and in a direction generally transverse to the plane of surfaces 60 and 61. A securing member 67 is disposed in bore 65 so that its rotation causes the length of the gap 62 to vary. It may be understood that rotation of securing member 67 causes a tightening or loosening of the arbor nut upon the arbor. In this manner, an additional degree of rotational resistance may be provided.

Securing member 67 may be operated either before or after jacking screws 22 are tightened against the spacer 15 to secure the combination against rotation movement by axial tightening. Thus, by tightening securing member 67, an additional measure of protection of axial movement is provided.

For ease of description, the principles of the invention have been set forth in connection with but a single-illustrated embodiment. It is not our intention that the illustrated embodiment nor the terminology employed in describing it be limiting inasmuch as variations in these may be made without department from the spirit of the invention. Rather, we desire to be restricted only by the scope of the appended claims.

We claim:

1. In a machine, the combination which comprises
   a. an arbor having a threaded shank portion,
   b. a rotatable tool disposed about said arbor,
   c. a generally annular spacer including first and second side faces generally perpendicular to the axis of said spacer, at least a portion of said first side face being in surface engagement with at least a portion of said tool,
   d. a nut for detachably interconnecting and tightening said arbor, tool and spacer, said nut including:
      1. a body provided with a threaded main bore and including a first and second side face and an exterior surface therebetween, said exterior surface being adapted to receive a torquing force for initially tightening the combination of said arbor, tool, and spacer,
      2. a plurality of threaded first bores in said body extending from said first side face to said second side face,
      3. a plurality of jacking screws arranged so that a jacking screw is disposed within each of said first bores, each of said jacking screws being defined by:
         a. a head portion adapted to be engaged by suitable torquing means, the head portion of one of said jacking screws being engageable independently of the engagement of another of said jacking screws,
         b. an end surface portion of said jacking screw adapted to contact said second side face of said spacer, whereby when said jacking screw is rotated, said end surface portion is advanced into engagement with said spacer thereby to induce high axial pressure between said nut and said threaded shank portion to maintain a tightened combination, e. at least one second bore, including a threaded portion, in said body extending from said first side face to said second side face, f. a recess in said second side face of said spacer, said recess being defined by a smooth surface having a generally circular cross section to permit axial movement of a member disposed therein when a jacking screw is advanced, and g. a locking member having a threaded portion engaged with the threaded portion of said second bore and having an end portion generally complementary to said recess at least a portion of said end portion thereof being located in said recess in said second side face of said spacer in such a manner to permit axial movement therein, whereby said combination is additionally secured against unwanted rotation relative to said arbor.

2. The invention of claim 1 wherein said recess is generally cylindrical bore in said spacer and said locking member is a boltlike structure having a generally cylindrical end portion engaged in said generally cylindrical bore in said spacer.

3. The invention of claim 1 wherein said nut further includes a pilot hole in said body extending from said first side face to said second side face for locating said recess in said spacer.

4. The invention of claim 1 wherein a plurality of recesses are located in said second side face of said spacer, any one of which may receive said end portion of a locking member for securing said combination against unwanted rotation relative to said arbor.